United States Patent
Cho

(10) Patent No.: US 8,538,950 B2
(45) Date of Patent: Sep. 17, 2013

(54) METHOD AND APPARATUS FOR EDITING GRAPHIC USER INTERFACE

(75) Inventor: Kyung-suk Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 774 days.

(21) Appl. No.: 12/039,132

(22) Filed: Feb. 28, 2008

(65) Prior Publication Data
US 2009/0077103 A1  Mar. 19, 2009

(30) Foreign Application Priority Data
Sep. 18, 2007  (KR) .................. 10-2007-0094897

(51) Int. Cl.
*G06F 17/30* (2006.01)
(52) U.S. Cl.
USPC ........................................ 707/711; 707/741

(58) Field of Classification Search
USPC .................................................. 707/711, 714
See application file for complete search history.

(56) References Cited

U.S. PATENT DOCUMENTS

| | | | |
|---|---|---|---|
| 2006/0053384 A1* | 3/2006 | La Fetra et al. | 715/765 |
| 2007/0094302 A1* | 4/2007 | Williamson et al. | 707/103 R |
| 2008/0134045 A1* | 6/2008 | Fridman et al. | 715/735 |
| 2008/0243959 A1* | 10/2008 | Bacastow et al. | 707/204 |
| 2008/0270453 A1* | 10/2008 | Bui et al. | 707/102 |

FOREIGN PATENT DOCUMENTS
JP  2004-206810 A  7/2004

* cited by examiner

*Primary Examiner* — Baoquoc N To
(74) *Attorney, Agent, or Firm* — Jefferson IP Law, LLP

(57) ABSTRACT

A method and apparatus for editing a user created content (UCC)-based graphic user interface (GUI). The method includes storing at least one content file in a predetermined folder; configuring a first-content table using a file name-index table and a file name of each of the at least one content file stored in the predetermined folder; and outputting the GUI based on the first-content index table.

22 Claims, 13 Drawing Sheets

SECOND-CONTENT INDEX TABLE  170

| CONTENT INDEX | FIRST STORING UNIT OFFSET | WIDTH | HEIGHT |
|---|---|---|---|
| 1 | 0 | 240 | 320 |
| 2 | 400 | 240 | 320 |
| 3 | 650 | 240 | 320 |
| ⋮ | ⋮ | ⋮ | ⋮ |
| 72 | 78000 | 240 | 320 |
| 73 | 78200 | 240 | 320 |
| 74 | 78450 | 240 | 320 |
| ⋮ | ⋮ | ⋮ | ⋮ |
| 144 | 156400 | 240 | 320 |
| · | 156600 | · | · |

FIG. 4

SECOND-CONTENT INDEX TABLE 170

| CONTENT INDEX | FIRST STORING UNIT OFFSET | WIDTH | HEIGHT |
|---|---|---|---|
| 1 | 0 | 240 | 320 |
| 2 | 400 | 240 | 320 |
| 3 | 650 | 240 | 320 |
| ⋮ | ⋮ | ⋮ | ⋮ |
| 72 | 78000 | 240 | 320 |
| 73 | 78200 | 240 | 320 |
| 74 | 78450 | 240 | 320 |
| ⋮ | ⋮ | ⋮ | ⋮ |
| 144 | 156400 | 240 | 320 |
| · | 156600 | · | · |

FIG. 5

FIRST-CONTENT INDEX TABLE

| CONTENT INDEX | FIRST STORING UNIT OFFSET | WIDTH | HEIGHT |
|---|---|---|---|
| 1 | 156600 | 240 | 320 |
| 2 | 157000 | 240 | 320 |
| 3 | 156800 | 240 | 320 |
| ⋮ | ⋮ | ⋮ | ⋮ |
| 72 | 166600 | 240 | 320 |
| 73 | 160600 | 240 | 320 |
| 74 | 157700 | 240 | 320 |
| ⋮ | ⋮ | ⋮ | ⋮ |
| 144 | 179600 | 240 | 320 |
| · | 180000 | · | · |

# METHOD AND APPARATUS FOR EDITING GRAPHIC USER INTERFACE

CROSS-REFERENCE TO RELATED APPLICATION

This application claims the benefit of Korean Patent Application No. 2007-94897, filed in the Korean Intellectual Property Office on Sep. 18, 2007, the disclosure of which is incorporated herein by reference.

BACKGROUND OF THE INVENTION

1. Field of the Invention

Aspects of the present invention relate to a method and apparatus for editing a graphic user interface (GUI), and more particularly, to a method and apparatus for editing a GUI according to a user's taste.

2. Description of the Related Art

A graphic user interface (GUI) is a task environment where a user exchanges information with a device through graphics. While the GUI was suggested to improve a work environment of a personal computer (PC) at an early stage, much attention has been recently given to GUI design with fierce competition in the designs of portable terminals such as cellular phones, personal digital assistants (PDAs), handheld PCs, and the like. GUIs are designed based on various content (such as images, sounds, and animation), but content for conventional GUIs are limited to those provided in terminals.

SUMMARY OF THE INVENTION

Aspects of the present invention provide a method and apparatus for editing a graphic user interface (GUI) based on a user created content (UCC).

According to an aspect of the present invention, a method of editing a graphic user interface (GUI) is provided. The method includes storing at least one content file in a predetermined folder; configuring a first-content index table using a file name-index table and a file name of each of the at least one content file stored in the predetermined folder; and outputting the GUI based on the first-content index table. The predetermined folder is a folder for the GUI. At least one of the at least one content file may be user created content (UCC) files.

According to another aspect of the present invention, the configuring of the first-content index table includes reading the at least one content file stored in the predetermined folder; searching for a content index in the file name-index table based on the file names of each of the at least one content file; storing the at least one content file in a first storing unit; and configuring the first-content index table using the found content index and storing position information for the at least one content file in the first storing unit.

According to another aspect of the invention, the configuring of the first-content index table further includes storing the first-content index table and the at least one content file stored in the first storing unit in a second storing unit; and deleting the at least one content file stored in the predetermined folder.

According to another aspect of the invention, the storing of the read content file in the first storing unit includes converting the at least one content file into an output format of a device using the GUI; compressing the at least one converted content file; and storing the at least one compressed content file in the first storing unit.

According to another aspect of the invention, the output of the GUI is performed by updating a GUI-purpose content mapping table with the first-content index table if UCC-based GUI output is requested.

According to another aspect of the invention, the configuring of the first-content index table is performed each time a device using the GUI is booted.

According to another aspect of the invention, if the configuring of the first-content index table is performed multiple times due to booting the device multiple times, a plurality of first-content index tables may be generated and managed.

According to another aspect of the present invention, an apparatus to edit a graphic user interface (GUI) is provided. The apparatus includes a file name-index table; and a control unit to configure at least one first-content index table using the file name-index table and a file name of each of at least one content file stored in a predetermined folder and to control user created content (UCC)-based GUI output based on the at least one first-content index table. The predetermined folder is a folder for the GUI.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 illustrates an example of a second-content index table of the apparatus illustrated in FIG. 1, according to an embodiment of the present invention;

FIG. 5 illustrates an example of a first-content index table according to an embodiment of the present invention;

DETAILED DESCRIPTION OF THE EMBODIMENTS

Figure 1:
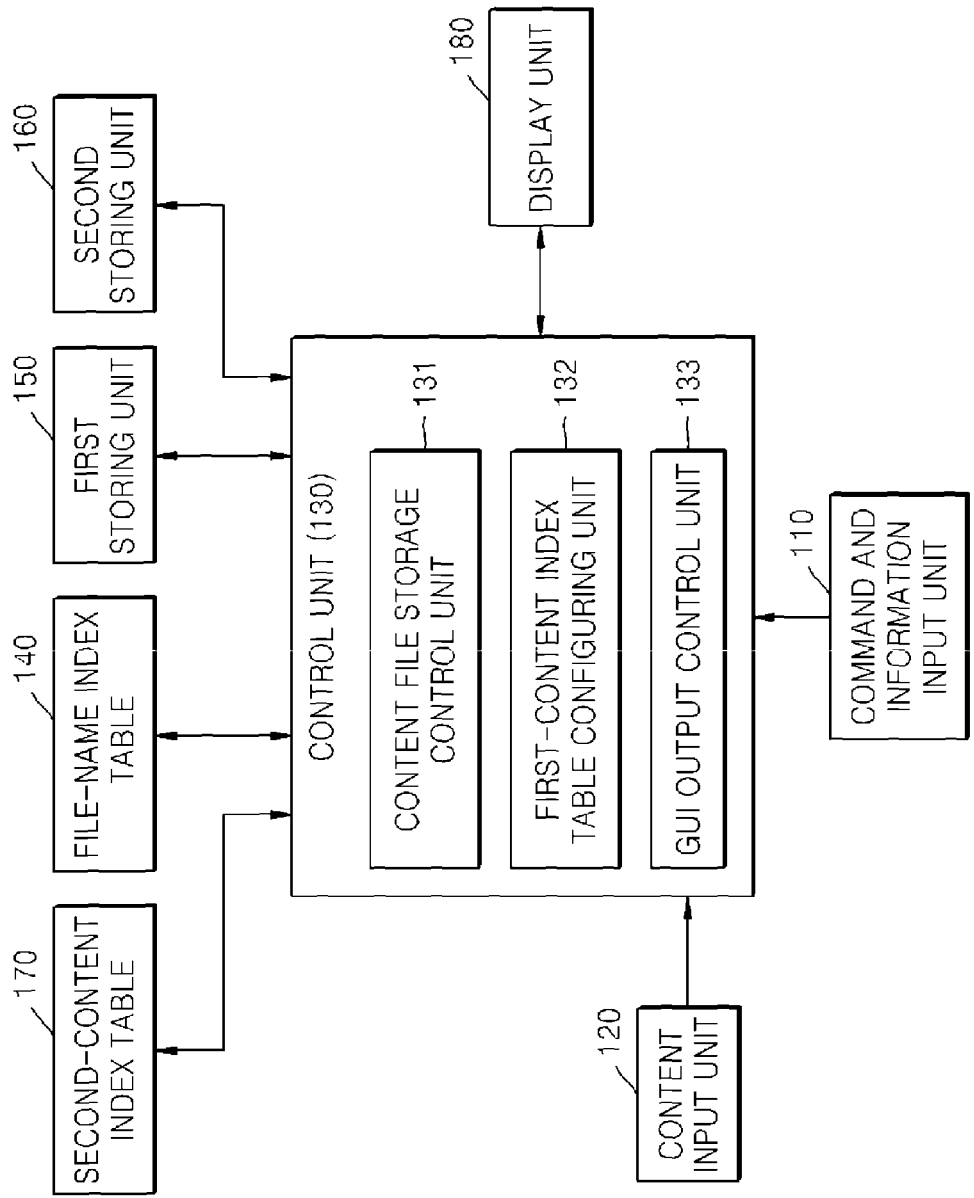
FIG. 1 is a schematic block diagram of an apparatus for editing a graphic user interface (GUI), according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention provide a method and apparatus for editing a graphic user interface (GUI) according to a user's taste. One or more user created content (UCC) files are stored in a predetermined folder, e.g., \SYSTEM\GUI, set in a device using the GUI, a first-content index table is configured using a file name-index table and a file name of each of the UCC files stored in the predetermined folder when booting the device using the GUI, and a mapping table for GUI-purpose content is updated with the first-content index table when requesting for UCC-based GUI output in order to control GUI output. The first-content index table may be defined as an index table of UCC-based GUI-purpose content. When booting the device using the GUI, the first-content index table is not configured if there is no content file stored in the predetermined folder. In addition, the first-content index table may be configured each time the device using the GUI is booted. Thus, a plurality of first-content index tables may be generated. In this case, a user can selectively use the plurality of first-content index tables when the user requests UCC-based GUI output.

FIG. 1 is a schematic block diagram of an apparatus 100 for editing a GUI, according to an embodiment of the present invention. The apparatus 100 includes a command and information input unit 110, a content input unit 120, a control unit 130, a file name-index table 140, a first storing unit 150, a second storing unit 160, a second-content index table 170, and a display unit 180. According to other aspects of the present invention, the apparatus 100 may include additional and/or different units. Similarly, the functionality of one or more of the above units may be integrated into a single component.

The command and information input unit 110 inputs a user control command and information required for GUI editing to the control unit 130. The user control command may include, for example, a UCC-based GUI output request command, a booting request command of the apparatus 100 or a device using the apparatus 100, a selection command with respect to a plurality of first-content index tables, or a content-based GUI output request command set in the device. The booting request command of the device may be interpreted as a power-on request command of the device. The information required for GUI editing may include a file name of an input content. In order to input the user control command and information, the command and information input unit 110 may include a plurality of buttons.

The content input unit 120 inputs UCC to the control unit 130. To this end, the content input unit 120 may include a universal serial bus (USB) port, an Internet transmission/reception unit, a wired/wireless transmission/reception unit, a memory connection port, or an element having a photographing function. These connections are merely exemplary, other aspects of the invention may employ different connections or standards.

The control unit 130 stores one or more content files in a predetermined folder of the device, configures one or more first-content index tables according to file names of the one or more content files stored in the predetermined folder and the file name-index table 140, and controls UCC-based GUI output according to the one or more first-content index tables. The device may be, for example, a Personal Computer (PC) or a portable terminal such as a cellular phone, a personal digital assistant (PDA), or a handheld PC. A UCC file input through the content input unit 120 can be defined as the first content file.

Figure 2:
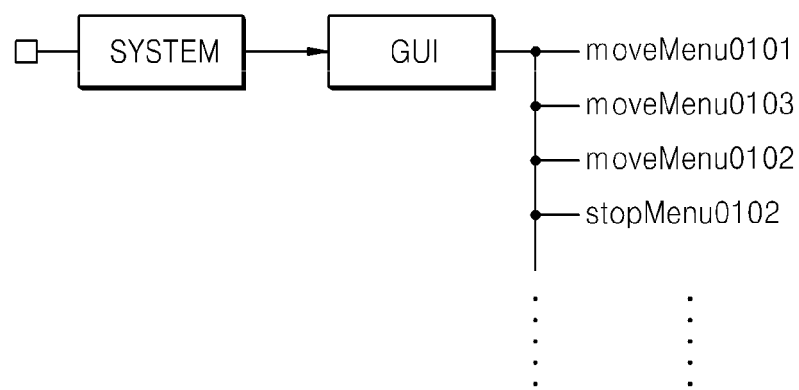
FIG. 2 illustrates an example of a predetermined folder that stores user created content (UCC) files according to an embodiment of the present invention.
Figure 3:
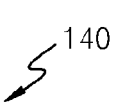
FIG. 3 illustrates an example of a file name-index table of the apparatus illustrated in FIG. 1, according to an embodiment of the present invention.

FIG. 2 shows an example of the predetermined folder that stores a user created content (UCC) file according to an embodiment of the present invention. FIG. 3 shows an example of the file name-index table 140, according to an embodiment of the present invention. When the predetermined folder is set to "\SYSTEM\GUI" as shown in FIG. 2 and one or more UCCs are input through the content input unit 120, the control unit 130 searches for the predetermined folder using a file system of the device. Once the predetermined folder is found, the control unit 130 stores the input UCCs in the found predetermined folder using file names input from the command and information input unit 110. Thus, the one or more content files stored in the predetermined folder are the UCC files input through the content input unit 120.

In FIG. 2, a UCC file that is input first from the content input unit 120 is stored in the name of "moveMenu0101", a UCC file that is input second from the content input unit 120 is stored in the name of "moveMenu0103", a UCC file that is input third from the content input unit 120 is stored in the name of "moveMenu0012", and a UCC file that is input fourth from the content input unit 120 is stored in the name of "stopMenu0102". A file name of a UCC file stored in the predetermined folder may be a GUI-purpose file name that is previously set in the device. However, a UCC file input from the content input unit 120 may also be stored using a file name that is not associated with the previously set GUI-purpose file name. In FIG. 2, GUI-purpose file names that are previously set in the device are used.

Once the apparatus 100 or the device is booted, the control unit 130 first searches for the predetermined folder using the file system of the device. If the predetermined folder is not found, GUI editing need not be initiated. However, if the predetermined folder is found, the control unit 130 configures the one or more first-content index tables according to file names of the one or more content files stored in the predetermined folder and the file name-index table 140.

When the one or more content files stored in the predetermined folder are as shown in FIG. 2 and the file name-index table 140 is as shown in FIG. 3, the control unit 130 sequentially reads the content files stored in the folder "\SYSTEM\GUI". Referring to the file name-index table 140 shown in FIG. 3, the device has 144 GUI-purpose content files, moveMenu0101 through moveMenu0908 among the 144 GUI-purpose content files as moving animation files, and stopMenu0011 through stopMenu0908 among the 144 GUI-purpose content files as repeated animation files. Such a configuration indicates that only a GUI other than a background can be edited. When the entire GUI including the background is to be edited, file names and content indices of content files corresponding to the background are added to the file name-index table 140 shown in FIG. 3. When the content files as shown in FIG. 2 are stored in the predetermined folder, the control unit 130 reads the content files from the predetermined folder in order of "moveMenu0101", "moveMenu0103", then "moveMenu0102". According to other aspects of the invention, any number of files, not just 144, may be used for the GUI content.

The control unit 130 searches for content indices in the file name-index table 140 based on the file names of the content files read from the predetermined folder. For example, when a file name of a content file read from the folder "\SYSTEM\GUI" is "moveMenu 0101", the control unit 130 checks if the same file name exists in the file name-index table 140. When the file name-index table 140 is as shown in FIG. 3, the found content index is "1". A content index found in the file name-index table 140 for the content file "moveMenu0013" read from the folder "\SYSTEM\GUI" is "3". If the same file name as that of a content file read from the folder "\SYSTEM\GUI" does not exist in the file name-index table 140, the control unit 130 ignores the file name of the content file read from the folder "\SYSTEM\GUI" and reads a content file stored next to the read content file.

The control unit 130 stores a content file read from the folder "\SYSTEM\GUI" in the first storing unit 150. In the first storing unit 150, a position in which a content file that is read first from the folder "\SYSTEM\GUI" is stored continues from a position in which a previously stored second-content file was last stored. The second-content file is a GUI-purpose content file provided by the device. Information about the position of the first storing unit 150 in which the second-content file is stored last, which will hereinafter be referred to as storing position information for the second-content file, is obtained from the second-content index table 170. The second content indicates a GUI-purpose content provided by the device.

FIG. 4 shows an example of the second-content index table 170 according to an embodiment of the present invention. When the second-content index table 170 is defined as shown in FIG. 4, the control unit 130 can recognize that a position of the first storing unit 150 in which the second-content file is stored last is an address "156599" by referring to the second-content index table 170. The control unit 130 sets an offset of a first first-content file to "156600" in the first storing unit 150 and then stores the first first-content file in the first storing unit 150. The control unit 130 can convert the first-content file into an output format of the device and compress the converted first-content file using run length encoding to store the compressed file in the first storing unit 150. Compression efficiency for a content file can be improved when the same data is consecutively included using a chroma-key effect.

In this way, the control unit 130 configures a first-content index table based on content indices found in the file name-index table 140 and storing position information (or offset information) in the first storing unit 150. The storing position information for the first first-content file in the first storing unit 150 is obtained with reference to the second-content index table 170. However, storing position information for a second first-content file and subsequent first-content files may be obtained according to the storage capacity of the previous first-content file stored in the first storing unit 150.

When a first-content file is compressed and stored, the storage capacity of the previous first-content file may be the same as the storage capacity of the compressed first-content file. Thus, when the file name-index table 140 is as shown in FIG. 3, the second-content index table 170 is as shown in FIG. 4, and content files stored in the folder "\SYSTEM\GUI" are as shown in FIG. 2, the control unit 130 can configure a first-content index table as shown in FIG. 5. FIG. 5 shows an example of a first-content index table according to an embodiment of the present invention. The folder is a predetermined folder. The predetermined folder is a folder for the GUI.

Figure 6:
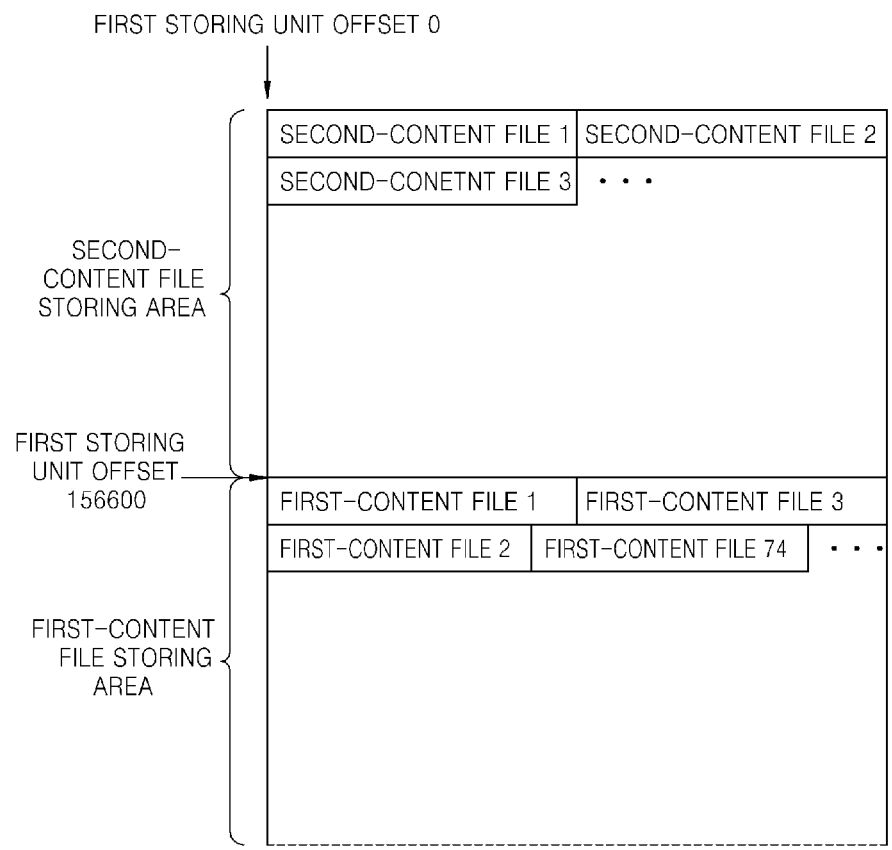
FIG. 6 illustrates an example of a map of a first storing unit of the apparatus illustrated in FIG. 1, according to an embodiment of the present invention.

The first storing unit 150 has a map as shown in FIG. 6. FIG. 6 shows an example of the first storing unit 150 of the apparatus 100, according to an embodiment of the present invention. Referring to FIG. 6, second-content files are stored from an offset "0" to an offset "156599" and first-content files are stored from an offset "156600". As mentioned previously, the second-content files are GUI-purpose content files set in the device and the first-content files are GUI-purpose UCC files input through the content input unit 120.

Figure 7:
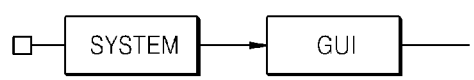
FIG. 7 illustrates an example of a predetermined folder from which a UCC file is removed, according to an embodiment of the present invention.

Once all content files stored in the folder "\SYSTEM\GUI" are read and stored in the first storing unit 150 and a first content index table for the content files is configured, the control unit 130 stores the first content files stored in the first storing unit 150 and the first content index table in the second storing unit 160 and deletes all the content files stored in the folder "\SYSTEM\GUI". The first-content files and the first-content index table may be stored in a hidden area of the second storing unit 160. The content files stored in the predetermined folder may be deleted after storing the first-content index table and the content files in the second storing unit 160 in order to prevent a first-content index table having the same information as that of the stored first-content index table from being repetitively generated. The folder "\SYSTEM\GUI" is changed into a state where all the first-content files are deleted as shown in FIG. 7.

During booting of the device and initialization of software, the first-content files and the first-content index table stored in the second storing unit 160 are moved to the first storing unit 150 in order to be used selectively according to a set GUI output mode. When the set GUI output mode is a UCC-based GUI output mode, a GUI according to the first-content files stored in the first storing unit 150 by the control unit 130 is output. When the set GUI output mode is a device-based GUI output mode, a GUI according to the second-content files stored in the first storing unit 150 by the control unit 130 is output. The display unit 180 displays a UCC-based GUI for the UCC-based GUI output mode and displays a GUI preset in the device for the device-based GUI output mode.

To perform GUI editing, the control unit 130 may include a content file storage control unit 131, a first-content index table configuring unit 132, and a GUI output control unit 133, as shown in FIG. 1. The content file storage control unit 131 controls the one or more content files to be stored in the predetermined folder and sequentially reads the one or more content files stored in the predetermined folder. The control unit 130 stores the content files in the predetermined folder using the content file storage control unit 131 and sequentially reads the content files stored in the predetermined folder. Once the first-content index table and the first-content files stored in the first storing unit 150 are stored in the second storing unit 160, the control unit 130 deletes the content files stored in the predetermined folder using the content file storage control unit 131.

The first-content index table configuring unit 132 configures the first-content index table according to the file name-index table 140 and the file names of the content files stored in the predetermined folder. The control unit 130 searches for content indices in the file name-index table 140 according to the file names of the read content files using the first-content index table configuring unit 132. The control unit 130 configures the first-content index table according to the found content indices and storing position information for the read content files in the first storing unit 150, while storing the read content files in the first storing unit 150. When the control unit 130 stores the read content files in the first storing unit 150, the control unit 130 converts the read content files into an output format of the device and compresses and stores the converted content files as mentioned above, using the first-content index table configuring unit 132.

The GUI output control unit 133 controls GUI output. The control unit 130 controls GUI output using the first-content files or the second-content files stored in the first storing unit 150 according to a set GUI output mode via the GUI output control unit 133. When the set GUI output mode is the UCC-based GUI output mode, the control unit 130 controls GUI output by updating a GUI-purpose content mapping table (not shown) with the first-content index table using the GUI output control unit 133. When the set GUI output mode is the device-based GUI output mode, the control unit 130 controls GUI output according to the GUI-purpose content mapping table using the GUI output control unit 133. The GUI-purpose content mapping table is usually set as the second-content index table 170. However, the GUI output control unit 133 may also be implemented such that the GUI-purpose content mapping table is updated with the second-content index table 170 when the GUI output mode is the device-based GUI output mode.

Figure 8:
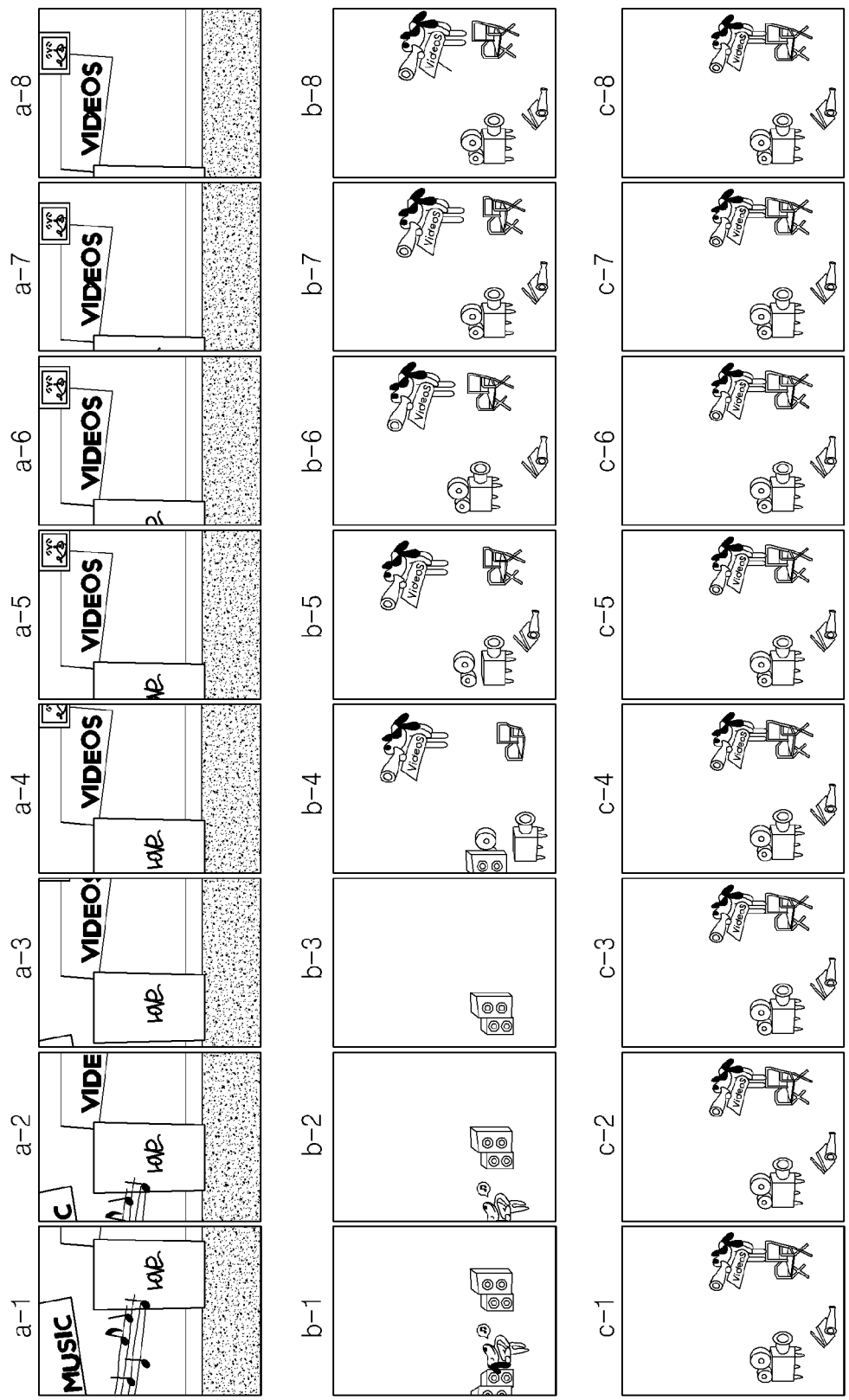
FIG. 8 illustrates examples of graphic user interface (GUI)-purpose content according to an embodiment of the present invention.
Figure 9:
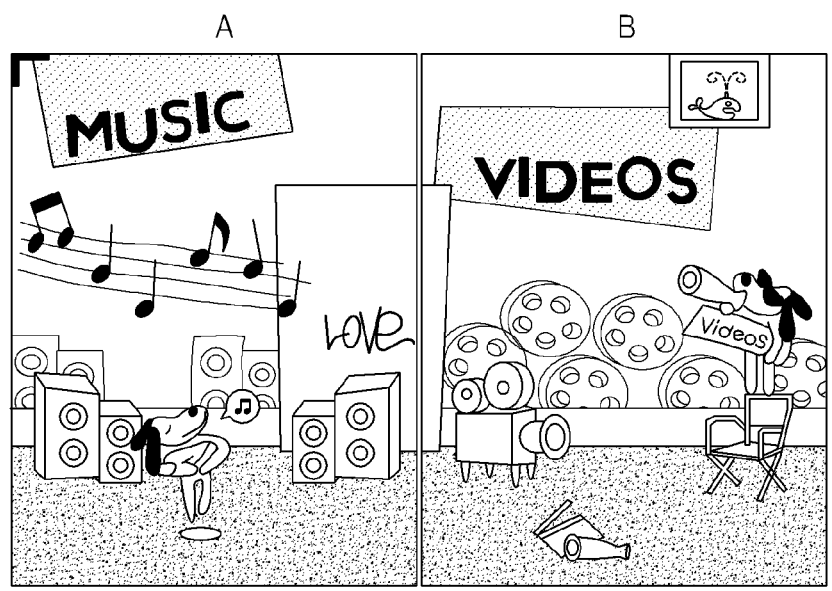
FIG. 9 illustrates an example of a GUI according to the GUI-purpose content illustrated in FIG. 8, according to an embodiment of the present invention.

FIG. 8 shows examples of graphic user interface (GUI)-purpose content according to an embodiment of the present invention. FIG. 9 shows an example of a GUI based on the GUI-purpose content shown in FIG. 8, according to an embodiment of the present invention. Referring to FIGS. 8 and 9, if scenes a-1 through a-8 correspond to a background and scenes b-1 through b-8 correspond to first-content files, and if a movement to the left is input using the command and information input unit 110, then the scenes a-1 through a-8 and the scenes b-1 through b-8 sequentially overlap each other, and a GUI moving from a scene A to a scene B is displayed on the display unit 180.

If a movement to the right is input using the command and information input unit 110, the scenes a-1 through a-8 and a GUI where the scenes b-1 through b-8 sequentially overlap each other in an order opposite to that of the movement to the left is displayed on the display unit 180. If a stop mode is controlled using the command and information input unit 110, the first-content files provided in the stop mode are scenes c-1 through c-8, and the background corresponds to the scenes a-1 through a-8, a GUI where the scenes c-1 through c-8 sequentially overlap the scene a-8 is displayed on the display unit 180.

When the first-content files read from the predetermined folder are stored in the first storing unit 150 after being compressed, the control unit 130 decompresses the first-content files read from the first storing unit 150 and then outputs the decompressed first-content files using the GUI output control unit 133.

Figure 10:
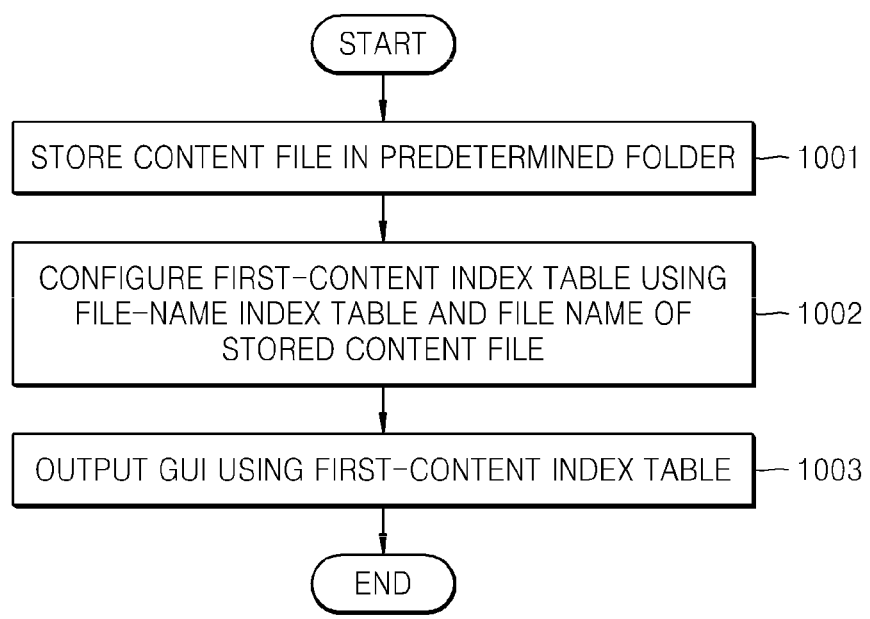
FIG. 10 is a flowchart illustrating a process of editing a GUI, according to an embodiment of the present invention.

FIG. 10 is a flowchart of a process of editing a GUI according to an embodiment of the present invention. One or more content files are stored in a predetermined folder in operation 1001. The predetermined folder may be the predetermined folder described with reference to FIG. 1. The content files may be UCC files. In operation 1002, a first-content index table is configured using a file name-index table set in a device using the GUI and file names of the content files stored in the predetermined folder. The predetermined folder is a folder for the GUI.

Figure 11:
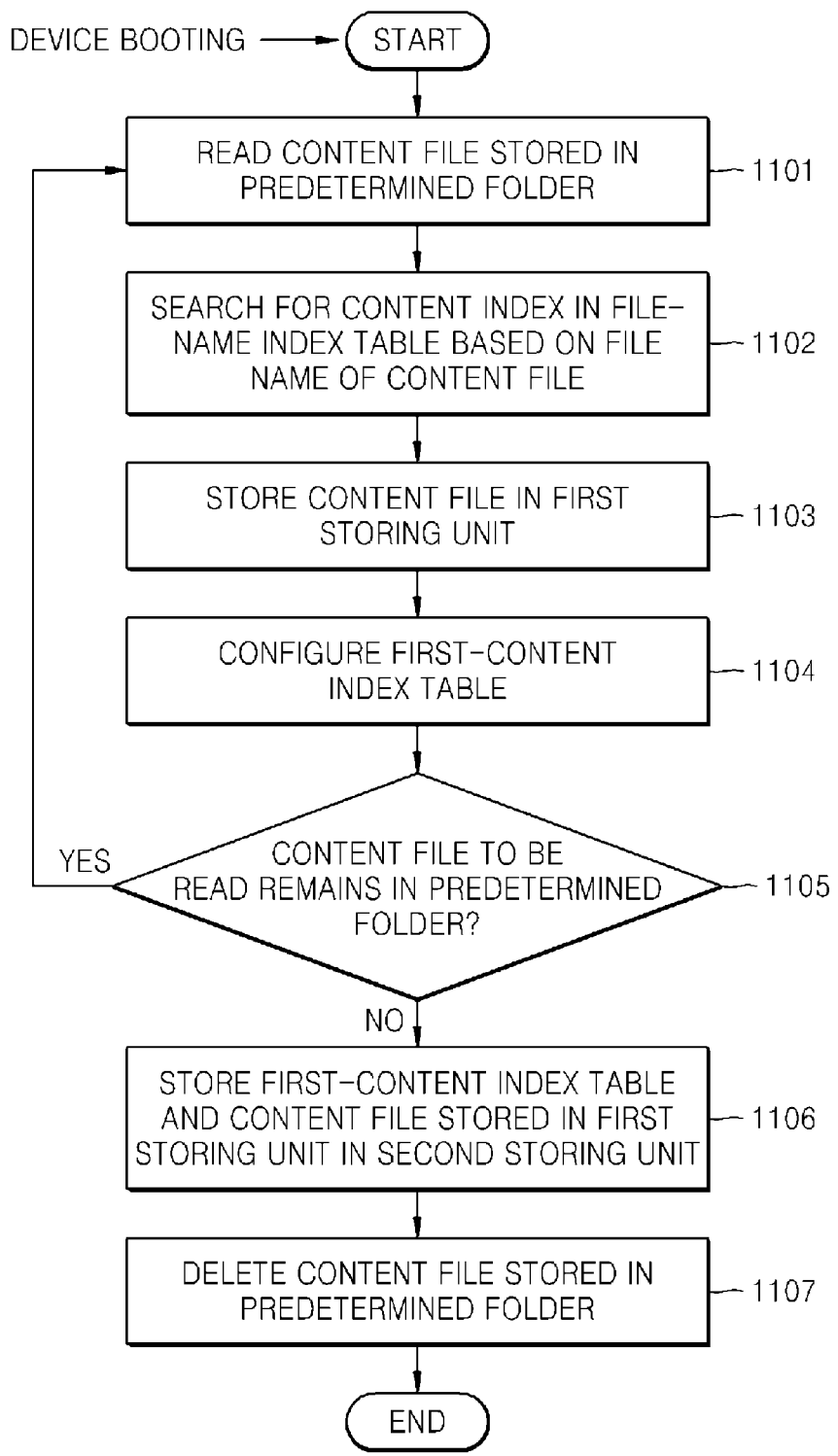
FIG. 11 is a flowchart illustrating a detailed process of configuring a first-content index table in the method illustrated in FIG. 10, according to an embodiment of the present invention.

FIG. 11 is a flowchart of a detailed process of operation 1002 of the process shown in FIG. 10, according to an embodiment of the present invention. Referring to FIG. 11, in order to configure the first-content index table, the content files stored in the predetermined folder are read in operation 1101. The content files may be sequentially read in operation 1101. Content indices are searched for in the file name-index table according to file names of the read content files in operation 1102. In operation 1103, the read content files are stored in a first storing unit.

Figure 12:
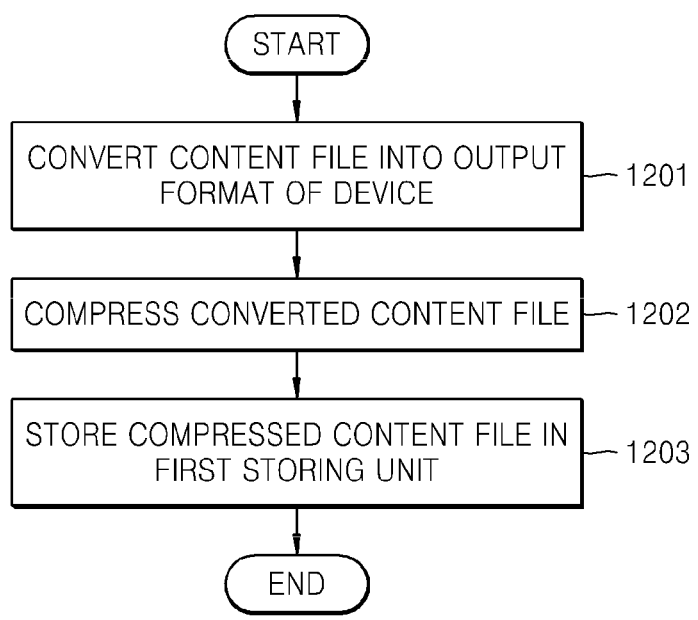
FIG. 12 is a flowchart illustrating a detailed process of storing a content file in a first storing unit in the process illustrated in FIG. 11, according to an embodiment of the present invention.

FIG. 12 is a flowchart of a detailed process of operation 1103 of the process shown in FIG. 11, according to an embodiment of the present invention. Referring to FIG. 12, the read content files are converted into an output format of the device using the GUI in operation 1201. The converted content files are compressed using run length encoding in operation 1202. The compressed content files are stored in the first storing unit in operation 1203.

Returning to FIG. 11, the first-content index table is configured according to the found content indices and storing position information for the read content files in the first storing unit in operation 1104. Whether a content file to be read remains in the predetermined folder is determined in operation 1105. If so, the process returns to operation 1101. If not, the first-content index table and the content files stored in the first storing unit are stored in a second storing unit in operation 1106. The content files stored in the predetermined folder are deleted in operation 1107.

The process of configuring the first-content index table can be performed each time the device is booted. Thus, if the process is performed multiple times due to booting of the device, a plurality of first-content index tables may be generated. The plurality of first-content index tables may be managed in order to allow a user to selectively use the plurality of first-content index tables for UCC-based GUI output. However, if the content files are not stored in the predetermined folder when booting of the device, the process of configuring the first-content index table may not be performed.

Referring back to FIG. 10, once the first-content index table is configured as described above, a GUI is output according to the configured first-content index table in operation 1003. Operation 1003 may be performed by updating a GUI-purpose content mapping table with the first-content index table according to request for UCC-based GUI output.

Figure 13:
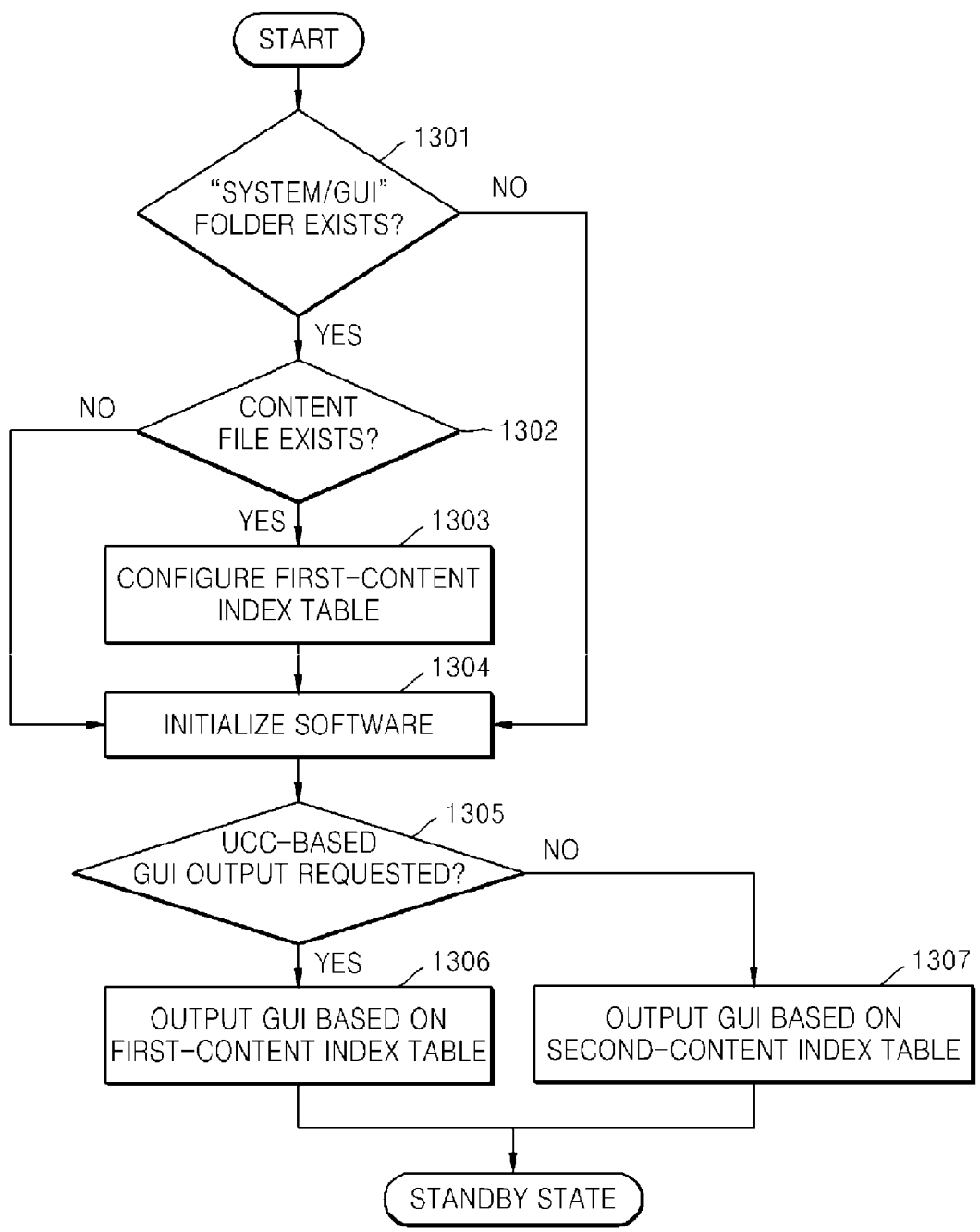
FIG. 13 is a flowchart illustrating a method of editing a GUI, according to another embodiment of the present invention.

FIG. 13 is a flowchart of a process of editing a GUI using the apparatus 100, according to another embodiment of the present invention. If an operation such as booting of a device is performed as described with reference to FIG. 11, whether a folder "\SYSTEM\GUI" exists using a file system of the device is determined in operation 1301.

If so, whether a content file exists in the folder "\SYSTEM\GUI" is determined in operation 1302. If one or more content files exist in the folder "\SYSTEM\GUI", a first-content index table is configured in operation 1303 as described regarding operation 1002 of FIG. 10. Software initialization is then performed in operation 1304 in order to operate the device normally. If the folder "\SYSTEM\GUI" does not exist or any content file does not exist in the folder "\SYSTEM\GUI", software initialization is performed without configuring the first-content index table.

After software initialization, whether UCC-based GUI output is requested is determined in operation 1305. If so, a GUI-purpose content mapping table is updated with the first-content index table and a corresponding GUI is output in operation 1306. If UCC-based GUI output is not requested, a GUI-purpose content mapping table is updated with a second-content index table and a corresponding GUI is output or a GUI is output using a GUI-purpose content mapping table having the second-content index table as default in operation 1307. The second-content index table is previously set in the device.

Figure 14:
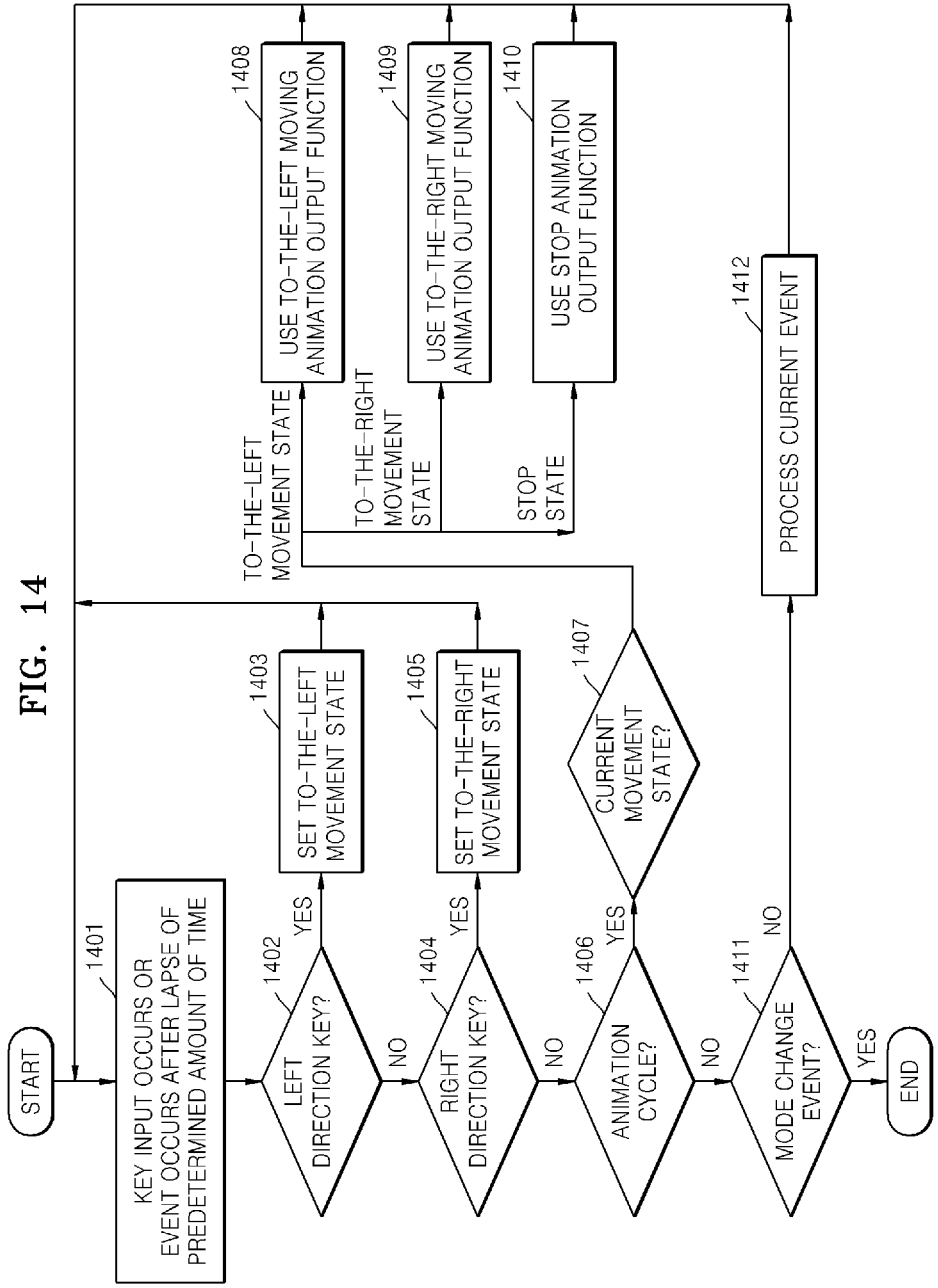
FIG. 14 is a flowchart illustrating a process of outputting a GUI in a process of editing the GUI, according to an embodiment of the present invention.

The GUI can be output as shown in FIG. 14. FIG. 14 is a flowchart of a process of outputting the GUI, according to an embodiment of the present invention. If a key input occurs using the command and information input unit 110 or an event occurs after a predetermined amount of time has elapsed, e.g., at intervals of 50-100 ms, in operation 1401, whether a left direction key is input is determined in operation 1402. If so, a to-the-left movement state is set for a GUI in operation 1403. A to-the-left movement state flag is set, and the process returns to operation 1401.

If the left direction key is not input in operation 1402, whether a right direction key is input is determined in operation 1404. If so, a to-the-right movement state is set for the GUI in operation 1405. A to-the-right movement state flag is set, and the process returns to operation 1401.

If the right direction key is not input in operation 1404, whether a current event corresponds to an animation cycle is determined in operation 1406. If so, a current movement state is determined in operation 1407. The current movement state may be determined according to a current set flag.

If the current movement state is the to-the-left movement state, a GUI is output using a to-the-left moving animation output function in operation 1408. When content files are provided as shown in FIG. 8, a buffer for GUI output is provided, and a content file corresponding to the scene a-1 is written in the buffer and is overwritten by a content file corresponding to the scene b-1. When pixel data is a chroma key value (R: 255, G: 0, B: 255), the pixel data is not written in the buffer. The chroma-key value can be set by a device manufacturer. Thus, combined scenes as shown in FIG. 9 are output as a GUI. If the to-the-left moving animation output function is called after the lapse of a predetermined amount of time, a content file corresponding to the scene a-2 is written in the buffer and is overwritten by a content file corresponding to the scene b-2. When a preset count value (8 in the case of FIG. 8) is reached by repeating such a process, a movement to the left is regarded as being completed and the to-the-left movement state is changed into a stop state.

If the current movement state is the to-the-right movement state, the GUI is output using a to-the-right moving animation output function in operation 1409. The GUI is output in the same manner as when using the to-the-left moving animation output function except that a content output order is reversed.

If the current movement state is the stop state, the GUI is output using a stop animation output function in operation 1410. When no key input occurs, animation where only a character moves in a stop background is output as a GUI. For example, a GUI in which the scene c-1 overlaps the background scene a-1 is output, and if the stop animation output function is called after the predetermined amount of time has elapsed, a GUI in which the scene c-2 overlaps the background scene a-1 is output. If an additional key input does not occur, GUIs in which the scenes c-1 through c-8 sequentially and repetitively overlap the background scene a-8 at predetermined time intervals are output.

If the current event does not correspond to the animation cycle in operation 1406, whether the current event is a mode change event is determined in operation 1411. If not, the current event is processed in operation 1412 and the process returns to operation 1401. The event may be a left key event, a right key event, a volume adjusting event, or an animation event. The animation event occurs each animation cycle. However, if the mode change event occurs in operation 1411, a GUI output mode is terminated. Other events are possible in addition to, or instead of, the above events.

In descriptions with reference to FIGS. 10 through 14, the processes may be performed by the control unit 130 of FIG. 1, the first storing unit may correspond to the first storing unit 150 of FIG. 1, the second storing unit may correspond to the second storing unit 160 of FIG. 1, the file name-index table may corresponding to the file name-index table 140 of FIG. 1, and the second-content index table may correspond to the second-content index table 170 of FIG. 1. The device mentioned in descriptions with reference to FIGS. 1 through 14 is a device using a GUI and may be a portable or non-portable device.

As described above, according to aspects of the present invention, a content index table is configured using file names of UCC files and file names previously set in a device using a GUI, thereby easily editing the GUI. Moreover, by editing the GUI based on UCC files, a GUI having content that suit the user's taste can be provided.

A program for executing a method of editing a GUI according to the present invention can be embodied as a computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, DVDs, magnetic tapes, floppy disks, and optical data storage devices. The computer-readable recording medium can also be distributed over a network of coupled computer systems so that the computer-readable code is stored and executed in a decentralized fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of editing a graphic user interface (GUI) screen in a device, the method comprising:
   determining whether a predetermined folder for editing the GUI screen is in the device;
   when the predetermined folder is in the device and at least one content file is in the predetermined folder, configuring a first GUI content mapping table using a file name-index table previously set in the device and a file name of each of the at least one content file stored in the predetermined folder, wherein the file name index table includes file names previously set in the device and content indexes corresponding to the previously set file names; and
   displaying at least one edited GUI screen based on the first GUI content mapping table on the device.

2. The method of claim 1, wherein the predetermined folder is a GUI folder and at least one content file comprises a User Created Content (UCC) file.

3. The method of claim 1, wherein the configuring of the first GUI content mapping table comprises:
   reading the at least one content file stored in the predetermined folder;
   searching for a content index in the file name-index table by determining whether a file name of the content file read from the predetermined folder is in the file name-index table;
   storing the at least one content file in a first storing unit; and
   configuring the first GUI content mapping table using the found content index and position information for the at least one content file in the first storing unit.

4. The method of claim 3, wherein the configuring of the first GUI content mapping table further comprises:
   storing the first GUI content mapping table and the at least one content file stored in the first storing unit in a second storing unit; and deleting the at least one content file stored in the predetermined folder.

5. The method of claim 3, wherein the storing of the at least one content file in the first storing unit comprises:
converting the at least one content file into an output format of the device;
compressing the at least one converted content file; and
storing the at least one compressed content file in the first storing unit.

6. The method of claim 1, wherein the editing of the GUI screen is performed according to a request for a User Created Content (UCC)-based GUI screen output.

7. The method of claim 6, further comprising displaying the GUI screen according to a second GUI content mapping table when UCC-based GUI screen output is not requested, wherein the second GUI content mapping table is preset in the device.

8. The method of claim 1, wherein the editing of the GUI screen is performed according to booting the device.

9. The method of claim 8, wherein, when no UCC file is stored in the predetermined folder, the configuring of the first GUI content mapping table is not performed.

10. The method of claim 1, wherein, when the configuring of the first GUI content mapping table is performed multiple times due to booting the device, a plurality of first GUI content mapping tables are generated and managed.

11. The method of claim 1, wherein the device comprises a portable terminal.

12. An apparatus to edit a graphic user interface (GUI) screen in a device, the apparatus comprising:
a file name-index table including file names previously set in the device and content indexes corresponding to the file names; and
a control unit, in order to edit at least one GUI screen in the device, for determining whether a predetermined folder for editing the GUI screen is in the device, when the predetermined folder is in the device and at least one content file is in the predetermined folder, configuring at least one first GUI content mapping table using the file names and content indexes included in the file name-index table and a file name of each of at least one content file stored in the predetermined folder, and displaying at least one edited GUI screen on the device based on the first GUI content mapping table.

13. The apparatus of claim 12, wherein the predetermined folder is a GUI folder and at least one content file comprises a User Created Content (UCC) file.

14. The apparatus of claim 12, further comprising:
a first storing unit for storing the at least one first-GUI content mapping table,
wherein the control unit comprises a content file storage control unit to control storage of the at least one content file in the predetermined folder, a first GUI content mapping table configuring unit to configure the at least one first GUI content mapping table based on the file names and content indexes included in the file name-index table and file names of each of the at least one content file stored in the predetermined folder, and a GUI screen display control unit to control displaying of the at least one edited GUI screen.

15. The apparatus of claim 14, wherein the first GUI content mapping table configuring unit reads the at least one content file stored in the predetermined folder using the content file storage control unit, searches for a content index in the file name-index table by determining whether a file name of the content file read from the predetermined folder is in the file name-index table, stores the at least one content file in the first storing unit, and configures the first GUI content mapping table based on the found content index and position information for the at least one content file stored in the first storing unit.

16. The apparatus of claim 15, further comprising:
a second storing unit to store the at least one first GUI content mapping table and the at least one content file stored in the first storing unit;
wherein the content file storage control unit deletes the at least one content file stored in the predetermined folder according to storing the at least one first GUI content mapping table and the at least one content file are stored in the second storing unit.

17. The apparatus of claim 15, wherein the first GUI content mapping table configuring unit converts the at least one content file into an output format of the device, compresses the at least one converted content file, and stores the at least one compressed content file in the first storing unit.

18. The apparatus of claim 17, wherein the control unit decompresses and then displays the at least one content file read from the first storing unit on the device in order to display the UCC-based GUI screen on the device.

19. The apparatus of claim 12, wherein the control unit controls editing the GUI screen in the device according to a request for a User Created Content (UCC)-based GUI output.

20. The apparatus of claim 12, wherein the device comprises a portable terminal.

21. The apparatus of claim 12, wherein the control unit controls editing the GUI screen in the device according to booting the device.

22. The apparatus of claim 12, wherein, when the configuring of the first GUI content mapping table by the control unit is performed multiple times due to booting the device, the control unit generates and manages a plurality of the first GUI content mapping tables.

* * * * *